US006812180B2

(12) United States Patent
Fukunaga

(10) Patent No.: US 6,812,180 B2
(45) Date of Patent: Nov. 2, 2004

(54) METHOD FOR PREPARING CATALYST

(75) Inventor: Tetsuya Fukunaga, Chiba-ken (JP)

(73) Assignees: Idemitsu Kosan Co., Ltd., Tokyo (JP); Chevron Phillips Chemical Company, LP, The Woodlands, TX (US)

( * ) Notice: Subject to any disclaimer, the term of this patent is extended or adjusted under 35 U.S.C. 154(b) by 0 days.

(21) Appl. No.: 10/076,589

(22) Filed: Feb. 19, 2002

(65) Prior Publication Data

US 2002/0193240 A1 Dec. 19, 2002

Related U.S. Application Data

(63) Continuation of application No. 09/555,527, filed as application No. PCT/JP98/05580 on Dec. 10, 1998, now abandoned.

(30) Foreign Application Priority Data

Dec. 10, 1997 (JP) .......................................... 9-339695

(51) Int. Cl.[7] .................................... B01J 29/06

(52) U.S. Cl. ........................ 502/66; 502/74; 502/64

(58) Field of Search ........................ 502/64, 66, 74, 502/224, 230, 60

(56) References Cited

U.S. PATENT DOCUMENTS 3,886,061 A * 5/1975 Weisang et al. ............ 208/138
3,963,601 A * 6/1976 Hilfman .................. 208/111.3
4,087,385 A * 5/1978 Wernli ........................ 502/340
4,344,868 A * 8/1982 Chang et al. ................. 502/74
4,444,909 A 4/1984 Chang et al.
4,568,656 A 2/1986 Poeppelmeier et al.
4,620,016 A * 10/1986 Drake et al. ................ 549/325
4,681,865 A * 7/1987 Katsuno et al. ............... 502/74
4,766,104 A * 8/1988 Fennemann ................. 502/218
4,960,894 A * 10/1990 Hoelderich et al. ......... 546/250
5,081,096 A * 1/1992 Monnier et al. ............ 502/348
5,314,854 A * 5/1994 Galperin ...................... 502/66
5,800,797 A * 9/1998 Matsumoto et al. ........ 423/625
5,851,379 A * 12/1998 Innes et al. ................. 208/138
5,888,922 A * 3/1999 Galperin ..................... 502/163
6,096,936 A * 8/2000 Fukunaga et al. .......... 585/419
6,207,042 B1 * 3/2001 Holtermann et al. ........ 208/139
6,518,470 B1 * 2/2003 Fukunaga et al. .......... 585/407

FOREIGN PATENT DOCUMENTS

| | | |
|---|---|---|
| EP | 0 988 891 | 3/2000 |
| GB | 1 436 458 | 5/1976 |
| JP | 52-096991 A | 8/1977 |
| JP | 58-036640 A | 3/1983 |
| JP | 1-176455 A | 7/1989 |
| JP | 06-039291 A | 2/1994 |
| JP | 11-000562 A | 1/1999 |
| WO | WO 97/13579 * | 4/1997 |

OTHER PUBLICATIONS

Supplementary European Search Report, EP 98 95 9150, Dec. 11, 2001; 3 pages.

Database WPI, AN 1983–35445K, XP–002184638 with Abstract of JP 58 036640, Mar. 3, 1983; 1 page.

Supplementary European Search Report; Dec. 11, 2001; 3 pages.

* cited by examiner

*Primary Examiner*—Kiley Stoner
*Assistant Examiner*—Christina Ildebrando
(74) *Attorney, Agent, or Firm*—Conley Rose, P.C.; Rodney B. Carroll; K. KaRan Reed

(57) ABSTRACT

A method for preparing a catalyst is herein disclosed which comprises the steps of impregnating a carrier with active components, particularly a platinum-containing compound and one or more halogen-containing compounds, drying the impregnated carrier, and then calcining the same, said drying treatment being carried out while the impregnated carrier is in a drifting condition. According to the above method, an activity of the catalyst can be improved, and a cracking selectivity can be reduced.

7 Claims, No Drawings

METHOD FOR PREPARING CATALYST

BACKGROUND OF THE INVENTION (i) Field of the Invention

The present invention relates to an improvement of a method for preparing a catalyst.

More specifically, the present invention relates to a method for preparing a catalyst, particularly a platinum-supporting halogen-treated L-type zeolite catalyst in which active components are supported on a carrier, and in this method, a drying treatment is carried out so that an evaporation rate of water from the whole surfaces of catalyst particles may be uniform in a drying treatment step, to homogeneously highly disperse the active components in the carrier and to thereby improve a catalytic activity.

(ii) Description of the Related Art

Heretofore, as catalysts for aromatizing non-aromatic hydrocarbons such as aliphatic hydrocarbons to produce aromatic hydrocarbons, platinum-aluminum catalysts have been used. However, these catalytic systems have a drawback that hydrocarbons having 6 and 7 carbon atoms cannot effectively be converted into the aromatic hydrocarbons.

Thus, in recent years, as a catalyst in which this drawback has been overcome, there has been found a catalyst in which platinum is supported on an L-type zeolite (Japanese Patent Publication No. 57408/1983). In this catalyst, a metal in the group VIII of the periodic table is supported on the L-type zeolite, but its activity is not sufficient and its life is inconveniently short. Afterward, for the sake of the improvement of the activity, a selectivity and the catalytic life and the simplification of a catalyst preparation method, various techniques have been suggested. For example, there have been suggested (1) a method which comprises supporting a metal in the group VIII on an L-type zeolite, and then subjecting it to an oxy-chlorination treatment to improve the catalytic activity and the life (Japanese Patent Application Laid-open No. 168539/1985), (2) a method which comprises treating an L-type zeolite with a solution containing a platinum salt and a non-platinum salt to improve platinum dispersion (Japanese Patent Application Laid-open No. 138539/1986), (3) a catalyst in which platinum is supported on an L-type zeolite treated with a halogen-containing compound (Japanese Patent Application Laid-open No. 57653/1987), (4) a catalyst in which platinum is supported on an L-type zeolite treated with a halogen-containing compound (Japanese Patent Application Laid-open No. 91334/1988), and (5) a simple catalyst preparation method which comprises the step of simultaneously supporting a platinum component and one or more halogen components on an L-type zeolite (Japanese Patent Application Laid-open No. 49936/1993).

However, the above method (1) has a drawback that a treating apparatus is complex, and the method (2) has a drawback that the catalytic activity is not sufficient. In addition, the catalysts of the above (3) and (4) make use of Freon which is a harmful substance in a halogen treatment, and they have a drawback that a high-temperature treatment is carried out, so that dealumination takes place and hence a surface area decreases. Moreover, in the above preparation method (5), there is a drawback that the obtained catalyst has a high cracking activity.

As understood from the foregoing, each of the conventional catalysts in which platinum is supported on the L-type zeolite has the disadvantage, and for the reason, they have not been always sufficiently satisfactory.

In this connection, it is known that in order to improve the activity of the obtained catalyst in the preparation of the catalyst in which the active component is supported on the carrier, the uniform and high dispersion of the active component on the carrier is important.

SUMMARY OF THE INVENTION

The present invention has been developed under such circumstances, and an object of the present invention is to provide a method for preparing a catalyst having an improved catalytic activity in which active components are supported on a carrier, particularly a method for preparing a platinum-supporting halogen-treated L-type zeolite catalyst which is desirable as a catalyst for the production of aromatic hydrocarbons and as a catalyst for the production of a gasoline and which can inhibit a cracking activity, can restrain the formation of coke (i.e., can restrain the deactivation of the catalyst by the coke), and can also improve an aromatic selectivity and a liquid yield.

The present inventor has intensively researched to achieve the above object, and as a result, it has been found that in a method which comprises impregnating a carrier with active components, drying the impregnated carrier, and then calcining the same to prepare a catalyst, the active components can uniformly and highly be dispersed and a catalytic activity can be improved by drying the impregnated carrier, i.e., the catalyst particles while they are always moved so that an evaporation rate of water from the whole surfaces of these catalyst particles may be uniform in the drying treatment step. In particular, it has been found that when a platinum-supporting halogen-treated L-type zeolite catalyst is prepared using an L-type zeolite as the carrier and using a platinum-containing compound and a halogen-containing compound as the active components, there can finally be obtained the catalyst in which the distribution of the halogen component is uniform, the platinum component is highly dispersed, an aromatizing activity can be improved, and a cracking selectivity deteriorates, by drying the catalyst particles while they are always moved. The present invention has been completed on the basis of such a knowledge.

That is to say, the present invention is directed to a method for preparing a catalyst which comprises the steps of impregnating a carrier with active components, drying the impregnated carrier, and then calcining the same, said drying treatment being carried out while the impregnated carrier is in a drifting condition. In particular, the present invention is directed to a method for preparing the catalyst wherein the carrier is an L-type zeolite, the active components are a platinum-containing compound and one or more halogen-containing compounds, and the obtained catalyst is a platinum-supporting halogen-treated L-type zeolite catalyst.

DETAILED DESCRIPTION OF THE PREFERRED EMBODIMENTS

In a preparation method of a catalyst according to the present invention, when the catalyst is prepared by impregnating a carrier with active components, and then subjecting this impregnated carrier to a drying treatment step and a calcination step, the above drying treatment of the impregnated carrier is carried out in a condition that the impregnated carrier is drifty, i.e., in a condition that the impregnated carrier is freely movable.

By conducting the drying treatment in such a condition, it can be presumed that an evaporation rate of water from the whole surfaces of the respective particles of the catalyst is uniform. For example, with regard to one certain catalyst particle, if this catalyst particle is fixed in the drying treatment step, water is scarcely evaporated from portions of the catalyst particle which are in contact with adjacent catalyst particles, but water is easily evaporated from the other portions of the catalyst particle which do not contact them. That is to say, in the one catalyst particle, the portions having the different drying rates are present. However, when the catalyst particles are always moved as in the present invention, the positions of the portions which contact the adjacent catalyst particles and the portions which do not contact them always change, so that the evaporation rate of water from the whole surface of the one catalyst particle is substantially uniform, whereby the active components can be homogeneously highly dispersed and hence a catalytic activity can be improved.

As techniques for drying the impregnated carrier in such a drifty condition, there are a method of doing the drying treatment while a drying container containing the impregnated carrier is rotated, and a method of doing the drying treatment while the drying container containing the impregnated carrier is shaken. Among them, the method in which the drying treatment is conducted under the rotation of the drying container containing the impregnated carrier is advantageous from the viewpoint of a functional effect. Furthermore, in both of the rotary drying treatment method and the shake drying treatment method just described, it is preferred that the drying treatment is done under reduced pressure, because evaporated water can be discharged from the system.

In the case that the drying treatment is done while the drying container containing the impregnated carrier is rotated, a revolution speed of the drying container is preferably 0.5 revolution/minute or more in the light of the functional effect, particularly preferably in the range of 0.5 to 200 revolutions/minute from a practical viewpoint.

Furthermore, as the method of doing the drying treatment while the drying container is shaken, there is a technique in which the drying treatment is carried out by the use of a shaking apparatus, but in this case, it is preferable to give, to the catalyst particles, such a shaking force as to permit moving the portions of the catalyst particles which contact the other catalyst particles at any time.

The method of the present invention can particularly advantageously be applied to the preparation of a platinum-supporting halogen-treated L-type zeolite catalyst. That is to say, in the preparation of the platinum-supporting halogen-treated L-type zeolite catalyst which comprises impregnating an L-type zeolite with a platinum-containing compound and one or more halogen-containing compounds as the active components, drying this impregnated zeolite, and then calcining it, it is desirable to apply the above method to the drying treatment of the impregnated zeolite. In the thus obtained platinum-supporting halogen-treated L-type zeolite catalyst, the dispersion of the halogen components is uniformed, and the platinum component is highly dispersed, so that an aromatizing activity is improved and a cracking selectivity deteriorates.

Next, the preparation method of this platinum-supporting halogen-treated L-type zeolite catalyst will be described.

The L-type zeolite which can be used in the preparation method of this catalyst is represented by the composition formula

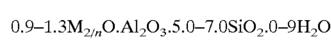

$$0.9\text{–}1.3M_{2/n}O.Al_2O_3.5.0\text{–}7.0SiO_2.0\text{–}9H_2O$$

wherein M is an alkali metal or an alkaline earth metal; and n is a valence of M.

Typical examples are disclosed on pages 9 and 10 of Japanese Patent Application Laid-open No. 133835/1983 as well as page 5 of Japanese Patent Application Laid-open No. 80333/1984.

On the other hand, no particular restriction is put on the above platinum-containing compound, and any compound is acceptable, so long as it becomes a platinum source, but a platinum salt is usually used. Examples of the platinum salt include tetraammineplatinum chloride, chloroplatinic acid, chloroplatinates, tetraammineplatinum hydroxide and dinitrodiaminoplatinum. These platinum-containing compounds may be used singly or in a combination of two or more thereof.

Furthermore, examples of the halogen-containing compound include various compounds. Typical examples thereof include chlorine-containing compounds such as hydrogen chloride and ammonium chloride, fluorine-containing compounds such as hydrogen fluoride and ammonium fluoride, iodine-containing compounds such as hydrogen iodide and ammonium iodide, and bromine-containing compounds such as hydrogen bromide and ammonium bromide. These halogen-containing compounds may be used singly or in a combination of two or more thereof.

In the preparation method of this platinum-supporting halogen-treated L-type zeolite catalyst, a treatment of impregnating the L-type zeolite with the platinum-containing compound and the halogen-containing compounds is firstly carried out. In this case, no particular restriction is put on a technique of the impregnation with the respective components, and there can be employed an atmospheric impregnation method, a vacuum impregnation method, an osmosis method or an ion exchange method. Above all, the atmospheric impregnation method and the vacuum impregnation method are particularly preferable, because these methods permit the uniform impregnation. In this impregnation treatment, the L-type zeolite may be impregnated with the respective compounds simultaneously or successively. In the case of the successive impregnation, no particular restriction is put on the impregnation order of the respective compounds.

After the impregnation treatment has been completed in this manner, the impregnated carrier is subjected to the drying treatment in a carrier drifting condition and then the calcination treatment in accordance with the above method. Drying conditions can suitably be selected in compliance with various requirements such as kinds of carrier and active components, but it is preferred that the drying treatment is carried out under reduced pressure. The pressure which can be used during the drying treatment is selected within the range of 5 to 750 Torr so that evaporated water can be discharged from the system. In addition, a drying temperature is usually selected within the range of room temperature to 200° C., and the drying treatment may be conducted at a constant temperature or at temperatures which are being raised. Alternatively, these ways may be combined to perform the drying treatment.

On the other hand, the calcination treatment is carried out at a temperature higher than the temperature of the drying treatment, usually at a temperature within the range of 250 to 350° C. No particular restriction is put on an atmosphere for the calcination treatment, but the calcination treatment is usually done in air. In this case, the air may be or may not be allowed to stream.

In the thus obtained platinum-supporting halogen-treated L-type zeolite catalyst, no particular restriction is put on the amount of the platinum component to be supported, but it is preferably within the range of 0.1 to 5.0% by weight, particularly preferably within the range of 0.3 to 1.5% by weight in terms of platinum based on the total weight of the catalyst from the viewpoint of a catalytic performance. Furthermore, no particular restriction is put on the amount of the halogen component to be supported, but it is preferably within the range of 0.1 to 5.0% by weight in terms of the halogen based on the total weight of the catalyst from the viewpoint of the catalytic performance.

The thus obtained platinum-supporting halogen-treated L-type zeolite catalyst can be used as a catalyst for preparing aromatic hydrocarbons and a gasoline.

For example, at least one fraction selected from a C6 fraction, a C7 fraction and a $C8^+$ fraction can be brought into contact with the above platinum-supporting halogen-treated L-type zeolite catalyst to thereby obtain the aromatic hydrocarbons.

Examples of the C6 fraction, the C7 fraction, and the $C8^+$ fraction include paraffin series hydrocarbons, olefin series hydrocarbons, acetylene series hydrocarbons, cyclic paraffin series hydrocarbons and cyclic olefin series hydrocarbons.

The above paraffin series hydrocarbons preferably have 6 to 10 carbon atoms, and typical examples thereof include n-hexane, methylpentane, n-heptane, methylhexane, dimethylpentane, n-octane, methylheptane and dimethylhexane.

Moreover, the above olefin series hydrocarbons preferably have 6 to 10 carbon atoms, and typical examples thereof include hexene, methylpentene, heptene, methylhexene, dimethylpentene and octene. In addition, the above acetylene series hydrocarbons preferably have 6 to 10 carbon atoms, and typical examples thereof include hexyne, heptyne and octyne.

The above cyclic paraffin series hydrocarbons preferably have 6 to 10 carbon atoms, and typical examples thereof include methylcyclopentane, cyclohexane, methylcyclohexane and dimethylcyclohexane.

Furthermore, the above cyclic olefin series hydrocarbons preferably have 6 to 10 carbon atoms, and typical examples thereof include methylcyclopentene, cyclohexene, methylcyclohexene and dimethylcyclohexene.

These hydrocarbons may be used singly or in a combination of two or more thereof. In addition, the raffinate can preferably be used.

No particular restriction is put on conditions in bringing the above hydrocarbon into contact with the catalyst of the present invention, but in order to obtain successful results, it is advantageous that the temperature is in the range of 350 to 600° C., preferably 400 to 550° C., the pressure is in the range of 0 to 40 kg/cm$^2$G, preferably 0 to 10 kg/cm$^2$G, and a liquid hourly space velocity (LHSV) is in the range of 0.1 to 20 hr$^{-1}$, preferably 1 to 10 hr$^{-1}$. Moreover, a feed ratio of a hydrogen gas/a raw material hydrocarbon is preferably selected within the range of 0.1 to 50 mol/mol.

Next, the present invention will be described in more detail in accordance with examples, but the scope of the present invention should not be limited at all by these examples.

EXAMPLE 1

(1) Preparation of a Catalyst 20 parts by weight of a silica binder (trade name Snowtex, made by Nissan Chemical Co., Ltd.) was added to 100 parts by weight of an L-type zeolite (trade name TSZ-500KOA, made by Toso Co., Ltd.), followed by kneading and molding. Afterward, the thus molded sample was calcined at 500° C. for 2 hours in air to obtain a molded L-type zeolite with a silica binder.

On the other hand, 0.086 g of tetraammineplatinum chloride, 0.088 g of ammonium fluoride, 0.019 g of ammonium chloride and 2.1 g of ion-exchanged water were mixed with each other to prepare a platinum·halogen-containing impregnation solution.

The thus prepared impregnation solution was slowly added dropwise to 5 g of the molded L-type zeolite including the silica binder with stirring to impregnate the zeolite with the platinum-containing compound and the halogen-containing compounds.

Next, the thus impregnated zeolite was subjected to a vacuum rotary drying treatment under a pressure of 40 Torr at a revolution speed of 30 rpm by the use of a rotary evaporator. At this time, the temperature of the impregnated zeolite was heated from room temperature to 100° C. over 40 minutes and kept at 100° C. for 3 hours.

Afterward, the zeolite was calcined at 300° C. for 1 hour in streaming air to prepare a platinum-supporting halogen-treated L-type zeolite catalyst.

(2) Evaluation of the Catalyst

A fixed bed flow type reactor was filled with catalyst grains of 32 to 65 mesh prepared by grinding the catalyst obtained in the above step (1), and a conversion reaction, into aromatic hydrocarbons, of the C6 fraction having a composition shown in Table 1 was carried out to evaluate a catalytic performance:

Amount of the catalyst: 0.25 g

Pressure: 5 kg/cm$^2$G

Temperature: 517° C.

WHSV (weight hourly space velocity): 32 hr$^{-1}$

Molar ratio of hydrogen/hydrocarbon: 5

Reaction time: 5 hr

A benzene yield and a C1–C5 selectivity were calculated as follows. The results thereof are shown in Table 2.

The benzene yield (wt %)=[(weight of benzene at outlet)/(weight of raw material hydrocarbons at inlet)]×100

The C1–C5 selectivity (wt %)=[(weight of C1–C5 at outlet)/{weight of (benzene+C1–C5) at outlet}]×100

TABLE 1

| Substance | Composition (wt %) |
|---|---|
| 2,3-dimethylbutane | 0.7 |
| 2-methylpentane | 9.3 |
| 3-methylpentane | 15.3 |
| n-hexane | 59.7 |
| methylcyclopentane | 13.5 |
| 2,4-dimethylpentane | 1.0 |
| 3,3-dimethylpentane | 0.5 |

COMPARATIVE EXAMPLE 1

(1) Preparation of a Catalyst

A platinum-supporting halogen-treated L-type zeolite catalyst was prepared by the same procedure as in Example 1 (1) except that in place of the vacuum rotary drying treatment of the impregnated zeolite in Example 1 (1), the drying treatment was performed by allowing the impregnated zeolite to stand in a dryer, heating it from room temperature to 100° C. over 40 minutes, and then keeping it at 100° C. for 3 hours.

(2) Evaluation of the Catalyst

For the performance of the catalyst obtained in the above (1), evaluation was made in the same manner as in Example 1 (2). The results thereof are shown in Table 2.

EXAMPLE 2

(1) Preparation of a Catalyst

A platinum-supporting halogen-treated L-type zeolite catalyst was prepared by the same procedure as in Example 1 (1) except that the vacuum rotary drying treatment of the impregnated zeolite in Example 1 (1) was replaced with an atmospheric rotary drying treatment.

(2) Evaluation of the Catalyst

For the performance of the catalyst obtained in the above (1), evaluation was made in the same manner as in Example 1 (2). The results thereof are shown in Table 2.

EXAMPLE 3

(1) Preparation of a Catalyst

A platinum-supporting halogen-treated L-type zeolite catalyst was prepared by the same procedure as in Example 1 (1) except that the vacuum rotary drying treatment of the impregnated zeolite in Example 1 (1) was carried out by heating the zeolite from 40° C. to 100° C. over 2.5 hours, and then keeping it at 100° C. for 30 minutes.

(2) Evaluation of the Catalyst

For the performance of the catalyst obtained in the above (1), evaluation was made in the same manner as in Example 1 (2). The results thereof are shown in Table 2.

TABLE 2

| | Benzene Yield (wt %) | C1–C5 Selectivity (wt %) |
|---|---|---|
| Example 1 | 56.5 | 5.8 |
| Example 2 | 55.9 | 6.0 |
| Example 3 | 58.2 | 4.0 |
| Comp. Ex. 1 | 49.7 | 6.8 |

The catalytic performance excels with an increase in benzene yield and a decrease in C1–C5 selectivity. As understood from the results in Table 2, the catalysts of Examples 1 to 3 in which the drying treatment has been carried out under the rotation have the higher benzene yields and the lower C1–C5 selectivities as compared with the catalyst of Comparative Example 1 in which the drying treatment has been carried out by still standing.

According to the present invention, when a catalyst is prepared by impregnating a carrier with an active component and then performing a drying treatment and a calcination treatment, an activity of the catalyst can be improved by carrying out the drying treatment of the impregnated carrier in a carrier drifting condition. If this method is applied to the preparation of a platinum-supporting halogen-treated L-type zeolite catalyst which can be used as a catalyst for the production of aromatic hydrocarbons or the like, there can be obtained a catalyst in which an aromatizing activity is improved and a cracking selectivity deteriorates.

What is claimed is:

1. A method for preparing a catalyst which comprises the steps of impregnating a carrier with active components, drying the impregnated carrier, and then calcining the same, said drying treatment being carried out while the impregnated carrier is in a drifting condition, wherein the carrier is an L-type zeolite, the active components are a platinum-containing compound and one or more halogen-containing compounds, and the obtained catalyst is a platinum-supporting halogen-treated L-type zeolite catalyst.

2. The method for preparing the catalyst according to claim 1 wherein the drying treatment is carried out while a drying container including the impregnated carrier is rotated.

3. The method for preparing the catalyst according to claim 2 wherein a revolution speed of the drying container is in the range of 0.5 to 200 revolutions/minute.

4. The method for preparing the catalyst according to claim 1 wherein the drying treatment is carried out under reduced pressure while a drying container is rotated.

5. The method for preparing the catalyst according to claim 1 wherein the drying treatment is carried out while a drying container including the impregnated carrier is shaken.

6. The method for preparing the catalyst according to claim 1 wherein the drying treatment is carried out while the impregnated carrier is being heated.

7. The method for preparing the catalyst according to claim 1 wherein the drying treatment is carried out while there is given, to the catalyst particles, such a shaking force as to permit moving the portions of the catalyst particles which contact the other catalyst particles at any time.

* * * * *